United States Patent [19]

Fukushima et al.

[11] Patent Number: 5,786,969
[45] Date of Patent: Jul. 28, 1998

[54] DISC CARTRIDGE WITH WEDGE-SHAPED INCLINED SHUTTER SLIDER ENGAGING PROTRUSION AND LINE CONTACT ENGAGEMENT BETWEEN SLIDER PORTION AND GROOVE OR PROTUSION OF CARTRIDGE BODY

[75] Inventors: Isamu Fukushima; Hiroshi Masuda; Makoto Arimura, all of Kurashiki, Japan

[73] Assignee: Mitsubishi Chemical Corporation, Tokyo, Japan

[21] Appl. No.: 807,318

[22] Filed: Feb. 27, 1997

Related U.S. Application Data

[63] Continuation of Ser. No. 388,065, Feb. 9, 1995, abandoned.

[30] Foreign Application Priority Data

| Feb. 15, 1994 | [JP] | Japan | 6-018338 |
| Aug. 24, 1994 | [JP] | Japan | 6-199564 |
| Sep. 8, 1994 | [JP] | Japan | 6-214750 |
| Sep. 26, 1994 | [JP] | Japan | 6-229670 |

[51] Int. Cl.$^6$ ................................. G11B 23/03
[52] U.S. Cl. ......................... 360/133; 369/291
[58] Field of Search ................... 360/133; 369/291

[56] References Cited

U.S. PATENT DOCUMENTS 4,849,844  7/1989  Kato ........................... 360/133

FOREIGN PATENT DOCUMENTS

| 0 202 660 A2/A3 | 11/1986 | European Pat. Off. . | |
| 0 325 388 A2/A3 | 7/1989 | European Pat. Off. . | |
| 0 339 651 A2/A3 | 11/1989 | European Pat. Off. . | |
| 0 440 175 A2/A3 | 8/1991 | European Pat. Off. . | |
| 0 442 502 A2/A3 | 8/1991 | European Pat. Off. . | |
| 0 497 604 A2/A3 | 8/1992 | European Pat. Off. . | |
| 0 573 291 A2/A3 | 12/1993 | European Pat. Off. . | |
| 4-162275 | 6/1992 | Japan | 369/291 |

OTHER PUBLICATIONS

The International Search Report dated Dec. 19, 1995.

*Primary Examiner*—Craig A. Renner
*Attorney, Agent, or Firm*—McAulay Fisher Nissen Goldberg & Kiel, LLP

[57] ABSTRACT

A disc cartridge for a disc-shaped recording medium includes a cartridge body having an opening portion for exposing a portion of a surface of the disc-shaped recording medium contained therein and a shutter for covering and uncovering the opening portion. A slider provided for supporting the shutter, is disposed on the cartridge body and is capable of sliding and is resiliently restored by a spring. The slider is engaged slidably with a groove or protrusion formed along a slide of the cartridge body by way of an engagement part. A portion of an engaging structure between the engagement part of the slider and the cartridge body makes a line contact between a protrusion or protrusion of the engagement part of the slider and the groove or protrusion of the cartridge body.

25 Claims, 14 Drawing Sheets

PRIOR ART   PRIOR ART

PRIOR ART

DISC CARTRIDGE WITH WEDGE-SHAPED INCLINED SHUTTER SLIDER ENGAGING PROTRUSION AND LINE CONTACT ENGAGEMENT BETWEEN SLIDER PORTION AND GROOVE OR PROTUSION OF CARTRIDGE BODY

This is a continuation, of application Ser. No. 08/388, 065, filed Feb. 9, 1995, now abandoned.

BACKGROUND OF THE INVENTION

The present invention relates to a disc cartridge, and more in particular, it relates to a disc cartridge suitable for containment of a magnetic disc, excellent in durability and easy to be assembled.

In the prior art, as shown in FIGS. 8 and 9 which illustrate a principal portion, a disc cartridge 1 comprises a cartridge body 2 and a disc-shaped recording member 3 contained rotatably in the cartridge body 2, in which engagement parts 5, 6 disposed on both longitudinal ends of a slider 4 are engaged with grooves or protrusions 7, 8 disposed to the inner surface of the cartridge body 2 for guiding the slider 4, shutter 9 is secured to the slider 4, for example, by screw setting, and a restoring member such as a spring 10 is mounted between one end of the slider 4 or one end of the shutter 9 and the cartridge body 2.

The shutter 9 is adapted to open against the restoring means by abutting a shutter opening pin 12 of a recording/reading out device against an end of the slider on the closing side and pushing to an opening direction.

FIG. 9 illustrates an open state in which the shutter 9 integrated with the slider 3 is caused to slide to an open position against the spring 10 and an opening portion 11 of the cartridge body 2 is exposed. When the shutter 9 is caused to slide to the opening position, the shutter opening pin 12 is adapted to fall in a recess 13 of the cartridge body 2 to lock the slider 4 and the shutter 9 at the open position.

In the disc cartridge of the prior art described above, since protrusions or grooves of the slider 4 are adapted to be in a close engagement part with guide grooves or guide protrusions 7, 8 of the cartridge body 2, the area of contact between the guide grooves or guide protrusions 7, 8 of the cartridge body 2 and the protrusions or the grooves of the slider 4 is enlarged to increase sliding resistance upon opening and closing the shutter 9.

Accordingly, as the number of opening and closing the shutter 9 is increased, a burden on the spring 10 increases, resulting in a problem of reducing its closing force. Depending on the case, this brings about a problem of breaking the spring 10 or resulting in erroneous closing that the shutter does not return to the closed position. Further, in the disc cartridge of the prior art, since the slider 4 can not be inserted and assembled after assembling the cartridge body 2, the slider 4 has to be previously assembled before assembling the cartridge body 2, resulting in a problem of making the assembling operation complicated and inefficient.

Further, for a disc cartridge casing used containing rotatably a circular disc such as a magneto optical disc or optical disc, it has been proposed to dispose a protruding support (hereinafter referred to as a rib) on the side facing the disc of the disc cartridge and to support a non-recording surface at an inner circumference of the disc by ribs, in order to prevent injury caused to a signal recording surface of the disc due to contact between the disc contained and the cartridge body, for example, in Japanese Patent Application Laid-Open KOKAI Nos. 61-982 and 62-186276. Then, when the recording/reading out of information is conducted to the optical disc, as shown in FIG. 14(a) and FIG. 14(b), a spindle 132 of a disc driving device is inserted into a spindle insertion hole 130 of a hub 129 of a disc cartridge, a magnetic member 131 disposed on the hub of the disc cartridge is secured by a magnet clamp 133 and writing (recording) or reading out (reproduction) is conducted by irradiating laser beams from below while rotating the spindle 132 and the clamp 133.

In the prior art device described above, the disc cartridge is disposed laterally, namely, disposed in a horizontal direction, and the spindle 132 of the driving device is inserted vertically from the beneath of the disc cartridge into the spindle insertion hole 130 to conduct recording/reading out of information.

In addition, it has also been known in an information recording/reading out system to dispose the disc cartridge in a vertical direction and inserting laterally the spindle of the driving device to the cartridge.

The system of vertically disposing the disc cartridge and laterally inserting the spindle of the driving device described above involves a problem as detailed later. Namely, as shown in FIG. 15(a) to FIG. 15(d), when a disc cartridge is disposed vertically, the center for a spindle insertion hole 130 of a disc deviates downwardly from a center of the disc cartridge (by a clearance in a disc containing portion) as shown in FIG. 15(a). When a spindle 132 of the driving device is laterally inserted and aligned for the center in this state, a disc 101 is at first pressed in a lateral direction by an inclined-portion 134 at the top end of a spindle 132, in which a portion thereof is pressed also in a perpendicular direction, that is, a vertical direction and caused to slide in the pushing direction, and a hub of the disc cartridge moves to the center for centering. As shown in FIG. 15(b) and FIG. 15(c), when the cartridge is disposed vertically, since the disc 101 is pushed laterally by the inclined portion 134 of the spindle 132, the disc 101 is brought into intense contact with a rib 111 making both of them into close contact at the face of contact, which hinders smooth sliding of the disc 101 in the vertical direction and hinders satisfactory centering of the disc 101.

Therefore, the close contact can not be attained normally between a magnet clamp portion 133 of the driving device and the surface of the magnetic member 131 of the hub 129, resulting in chuck failure, and there may be arisen a problem in that the spindle of the driving device rotates in this state, thereby causing generation of abnormal sounds or failure of the disc 101 and further, causing operation failure of the driving device due to the eccentric rotation of the disc 101.

Also, for opening a shutter for opening/closing an opening part (head insertion hole) of the cartridge body in a disc cartridge, when the cartridge is inserted into a disk driving device, a slot pin at an end of a shutter opening lever disposed to the driving device is inserted into a shutter opening slot disposed to the shutter, and the slot pin pushes the shutter in one direction according as the cartridge is thrust thereinto, thereby opening the shutter. Since the shutter opening lever is at a position nearly parallel with the inserting direction of the cartridge upon starting the opening, an excess force is exerted. Particularly, when the disc cartridge is put to repeated loading/unloading operations in use by an automatic changer or the like, a problem may occur in that an excess force exerts on the shutter opening lever of the driving device to gradually result in rattling, thereby bringing about operation failure, and no smooth shutter opening can be attained.

Furthermore, in the disc cartridge, it is necessary that the shutter attached for closing the opening portion disposed to the cartridge body has a considerable mechanical strength and is thin in thickness, since the entire thickness of the disc cartridge is limited. Therefore, the shutter is formed, for example, by punching out a thin metal plate such as a stainless steel sheet in accordance with a shape of the opening or the like and then bending the punched out plate. Therefore, the end face of the shutter is thin-walled and has a sharp shape. Accordingly, when the end face of the metal shutter abuts against the cartridge body made of a synthetic resin, the cartridge body may be scraped, resulting in scraping dusts which cause undesired effect when they are attached on the surface of the recording medium. In particular, when the shutter releasing mechanism is opened, the end of the shutter may vigorously abut by the resiliency of the spring member against a raised wall of the sliding recess disposed to the cartridge body, resulting in the scraping dusts. The resultant scraping dusts may hinder normal recording/reading out operation, and if the scraping dusts intrude into the cartridge and attach on a signal recording surface of the disc-shaped recording medium, it may cause signal drop out, particularly in an optical disc for reading signals by laser beams, since the scraping dust is larger as compared with the beam diameter (usually about 1 μm diameter).

As a result of the present inventors' earnest studies in order to overcome the foregoing drawbacks, it has been found that in a disc cartridge containing a disc-shaped recording medium, comprising a cartridge body having an opening portion provided in one side of the cartridge body for exposing a portion of the surface of the disc-shaped recording medium contained therein; a shutter provided on the cartridge body for opening and closing the opening portion, and a slider disposed to the cartridge body in a state capable of sliding and being resiliently restored by a spring for supporting the shutter, the slider being engaged slidably with a groove or protrusion formed along one side of the cartridge body by way of an engagement part provided on the slider, by making at least a portion of an engaging structure between the engagement part of the slider and the cartridge body a line contact at between a protrusion or groove of the engagement part of the slider and the groove or the protrusion of the cartridge body, the sliding resistance can be reduced, thereby prolonging the working life of the spring and preventing erroneous closing operation; and/or that under the consideration that when a disc cartridge is disposed vertically and a spindle of a disc driving device is laterally inserted into a hub disposed on a central portion of a lower half constituting a cartridge body, a disc is intensely pushed laterally to bring the disc surface and the surface of a rib disposed at the portion of an inner wall surface of an upper half constituting the cartridge body into close contact, which concentrates the pushing force to the surface of contact making incomplete centering of the disc, causing chuck failure, by bringing a hat-shaped portion of a magnet clamping hub into contact with the upper half to enlarge the contacting area and disperse the pushing force and/or by roughening at least one contact surface of the surface of a disc contained in the cartridge body and the surface of the rib, the centering of the disc is easily accomplished, no abnormal sounds are generated, no operation failure is caused to the driving device and no damages are caused to the disc in the aforementioned disc cartridge; and/or that by adapting to rotate a slot pin at an end of a shutter opening lever on an upper end surface of a guide sliding portion of a half constituting a cartridge body and simultaneously pushing a shutter opening slot to slide the slider, thereby opening the shutter, a force exerted on the shutter opening lever upon starting the shutter opening can be decreased remarkably, thereby greatly increasing the life of the shutter opening lever.

The present invention has been attained based on such findings.

SUMMARY OF THE INVENTION

It is an object of the present invention to provide a disc cartridge in which the reliability for opening and closing a shutter is improved by reducing the sliding resistance of the slider, thereby prolonging the working life of the spring, as well as the slider can be assembled by inserting it from the outside to the cartridge body after assembling the cartridge body.

Another object of the present invention is to provide a disc cartridge which can be used satisfactorily also to a vertically disposed driving device.

To accomplish the aims, in a first aspect of the present invention, there is provided a disc cartridge containing a disc-shaped recording medium, and comprising a cartridge body having an opening portion for exposing a portion of a surface of a disc contained therein, a shutter for opening and closing the opening portion, and a slider for supporting the shutter, disposed on the cartridge body in a state capable of sliding and resiliently restored by a spring, wherein the slider is engaged slidably with a groove or protrusion formed along a side of the cartridge body by way of an engagement part and at least a portion of an engaging structure between the engagement part of the slider and the cartridge body makes a line contact between a protrusion or groove of the engagement part of the slider and the groove or the protrusion of the cartridge body.

In a second aspect of the present invention, there is provided a disc cartridge comprising a cartridge body comprising an upper half and a lower half and containing rotatably therein a disc, wherein a magnet clamping hub having a hat-shaped portion is disposed at a central portion of the disc cartridge, the hat-shaped portion has such a structure that the top end face of the hat-shaped portion is brought into contact with the inner surface of the upper half when a spindle of a disc driving device is inserted into the hub.

In a third aspect of the present invention, there is provided a disc cartridge having a cartridge body comprising an upper half and a lower half and containing rotatably therein a disc, wherein a magnet clamping hub having a hat-shaped portion is disposed at a central portion of the disc cartridge, disc receiving ribs are disposed each in an annular shape on the disc-containing wall surfaces of the upper half and the lower half at a position corresponding to the non-recording area at the inner circumferential portion of the disc to be contained, and at least one of the surface of said ribs and the corresponding surface of the inner circumferential portion of the disc is roughened.

In a fourth aspect of the present invention, there is provided a disc cartridge having an opening/closing shutter, wherein a slider is disposed slidably on one side edge of the disk cartridge, a shutter is secured to the slider, and the lower surface of a shutter opening slot of the slider for receiving a shutter opening slot pin is situated at a position in flush with or below an upper end surface of a guide sliding portion of a half constituting a cartridge body, so that the slot pin rotates on the upper end surface of the guide sliding portion.

In a fifth aspect of the present invention, there is provided a disc cartridge comprising a synthetic resin cartridge body and containing rotatably a disc-shaped recording medium and having an opening for exposing a portion of a signal recording surface of a disc-shaped recording medium to the outside, a slider attached slidably to a sliding recess of said cartridge body, and a metal shutter for opening/closing said opening by way of said slider, wherein the cartridge has a structure of closing the shutter in such a state that an end face of the slider is in contact with an end face of the sliding recess and a gap is present between an end face of the shutter and the cartridge body.

In a sixth aspect of the present invention, there is provided a disc cartridge containing a disc-shaped recording medium, comprising a cartridge body comprising an upper half and a lower half, and having an opening portion for exposing a portion of a surface of a disc rotatably contained therein, a shutter for opening and closing the opening portion, and a slider for supporting the shutter, disposed to the cartridge body in a state capable of sliding and resiliently restored by a spring, wherein the slider is engaged slidably with a groove or protrusion formed along a side of the cartridge body by way of an engagement part, at least a portion of an engaging structure between the engagement part of the slider and the cartridge body makes a line contact at between a protrusion or groove of the engagement part of the slider and the groove or the protrusion of the cartridge body, a magnet clamping hub having a hat-shaped portion is disposed at a central portion of the disc cartridge, and the hat-shaped portion has such a structure that the top end face of the hat-shaped portion is brought into contact with the inner surface of the upper half when a spindle of a disc driving device is inserted into the hub.

In a seventh aspect of the present invention, there is provided a disc cartridge containing a disc-shaped recording medium, comprising a cartridge body comprising an upper half and a lower half, and having an opening portion for exposing a portion of a surface of a disc contained therein, a shutter for opening and closing the opening portion, and a slider for supporting the shutter, disposed to the cartridge body in a state capable of sliding and resiliently restored by a spring, wherein the slider is engaged slidably with a groove or protrusion formed along a side of the cartridge body by way of an engagement part, at least a portion of an engaging structure between the engagement part of the slider and the cartridge body makes a line contact between a protrusion or groove of the engagement part of the slider and the groove or the protrusion of the cartridge body, a magnet clamping hub having a hat-shaped portion is disposed at a central portion of the disc cartridge, disc receiving ribs are disposed each in an annular shape on the disc-containing wall surfaces of the upper half and the lower half at a position corresponding to the non-recording area at the inner circumferential portion of the disc to be contained, and at least one of the surface of said ribs and the corresponding surface of the inner circumferential portion of the disc is roughened.

In an eighth aspect of the present invention, there is provided a disc cartridge containing a disc-shaped recording medium, and comprising a cartridge body having an opening portion for exposing a portion of a surface of a disc contained therein, a shutter for opening and closing the opening portion, a slider for supporting the shutter resiliently restored by a spring, and an opening/closing shutter, wherein the slider is engaged slidably with a groove or protrusion formed along a side of the cartridge body by way of an engagement part, at least a portion of an engaging structure between the engagement part of the slider and the cartridge body makes a line contact at between a protrusion or groove of the engagement part of the slider and the groove or the protrusion of the cartridge body, the slider is disposed slidably on one side edge of the disk cartridge, the shutter is secured to the slider, and the lower surface of a shutter opening slot of the slider for receiving a shutter opening slot pin is situated at a position in flush with or below an upper end surface of a guide sliding portion of a half constituting a cartridge body, so that the slot pin rotates on the upper end surface of the guide sliding portion.

In a ninth aspect of the present invention, there is provided a disc cartridge containing a disc-shaped recording medium, and comprising a cartridge body having an opening portion for exposing a portion of a surface of a disc contained therein, a slider for supporting the shutter, disposed to the cartridge body in a state capable of sliding and being resiliently restored by a spring, and a metal shutter for opening/closing said opening by way of the slider, wherein the slider is engaged slidably with a groove or protrusion formed along a side of the cartridge body by way of an engagement part and at least a portion of an engaging structure between the engagement part of the slider and the cartridge body makes a line contact at between a protrusion or groove of the engagement part of the slider and the groove or the protrusion of the cartridge body, and the cartridge has a structure of closing the shutter in such a state that an end face of the slider is in contact with an end face of the sliding recess and a gap is present between an end face of the shutter and the cartridge body.

In a tenth aspect of the present invention, there is provided a disc cartridge comprising a cartridge body comprising an upper half and a lower half and containing rotatably therein a disc, wherein a magnet clamping hub having a hat-shaped portion is disposed at a central portion of the disc cartridge, the hat-shaped portion has such a structure that the top end face of the hat-shaped portion is brought into contact with the inner surface of the upper half when a spindle of a disc driving device is inserted into the hub, disc receiving ribs are disposed each in an annular shape on the disc-containing wall surfaces of the upper half and the lower half at a position corresponding to the non-recording area at the inner circumferential portion of the disc to be contained, and at least one of the surface of the ribs and the corresponding surface of the inner circumferential portion of the disc is roughened.

In an eleventh aspect of the present invention, there is provided a disc cartridge comprising a cartridge body comprising an upper half and a lower half and containing rotatably therein a disc, and having an opening/closing shutter for containing a disc-shaped recording medium, wherein a magnet clamping hub having a hat-shaped portion is disposed at a central portion of the disc cartridge, the hat-shaped portion has such a structure that the top end face of the hat-shaped portion is brought into contact with the inner surface of the upper half when a spindle of a disc driving device is inserted into the hub, a slider is disposed slidably on one side edge of a disk cartridge, a shutter is secured to the slider, and the lower surface of a shutter opening slot of the slider for receiving a shutter opening slot pin is situated at a position in flush with or below an upper end surface of a guide sliding portion of a half constituting the cartridge body so that the slot pin rotates on the upper end surface of the guide sliding portion.

In a twelfth aspect of the present invention, there is provided a disc cartridge comprising a cartridge body comprising an upper half and a lower half, and containing rotatably a disc-shaped recording medium and having an opening for exposing a portion of a signal recording surface of a disc-shaped recording medium to the outside, a slider attached slidably to a sliding recess of the cartridge body and a metal shutter for opening/closing said opening by way of the slider, wherein a magnet clamping hub having a hat-shaped portion being disposed at a central portion of the disc cartridge, the hat-shaped portion has such a structure that the top end face of the hat-shaped portion is brought into contact with the inner surface of the upper half when a spindle of a driving device is inserted into the hub, and the cartridge has a structure of closing the shutter in such a state that an end face of the slider is in contact with an end face of the sliding recess and a gap is present between an end face of the shutter and the cartridge body.

In a thirteenth aspect of the present invention, there is provided a disc cartridge having a cartridge body comprising an upper half, a lower half and containing rotatably therein a disc, and having an opening/closing shutter, wherein a magnet clamping hub having a hat-shaped portion is disposed at a central portion of the disc cartridge, disc receiving ribs are disposed each in an annular shape on the disc-containing wall surfaces of the upper half and the lower half at a position corresponding to the non-recording area at the inner circumferential portion of the disc to be contained, at least one of the surface of said ribs and the corresponding surface of the inner circumferential portion of the disc is roughened, a slider is disposed slidably on one side edge of the disk cartridge, a shutter is secured to the slider, and the lower surface of a shutter opening slot of the slider for receiving a shutter opening slot pin is situated at a position in flush with or below an upper end surface of a guide sliding portion of a half constituting a cartridge body, so that the slot pin rotates on the upper end surface of the guide sliding portion.

In a fourteenth aspect of the present invention, there is provided a disc cartridge having a cartridge body comprising an upper half and a lower half and containing rotatably therein a disc-shaped recording medium, and having an opening portion for exposing a portion of a signal recording surface of a disc-shaped recording medium to the outside, a slider attached slidably to a sliding recess of the cartridge body and a metal shutter for opening/closing the opening by way of said slider, wherein a magnet clamping hub having a hat-shaped portion is disposed at a central portion of the disc cartridge, disc receiving ribs are disposed each in an annular shape on the disc-containing wall surfaces of the upper half and the lower half at a position corresponding to the non-recording area at the inner circumferential portion of the disc to be contained, at least one of the surface of said ribs and the corresponding surface of the inner circumferential portion of the disc is roughened, and the cartridge has a structure of closing the shutter in such a state that an end face of the slider is in contact with an end face of the sliding recess, and a gap is present between an end face of the shutter and the cartridge body.

In a fifteenth aspect of the present invention, there is provided a disc cartridge for containing a disc-shaped recording medium, comprising a cartridge body comprising an upper half and a lower half and having an opening for exposing a portion of a surface of a disc contained therein, a shutter for opening and closing the opening, a slider for supporting the shutter disposed to the cartridge body in a state capable of sliding and resiliently restored by a spring, wherein the slider is engaged slidably with a groove or protrusion formed along a side of the cartridge body by way of an engagement part, at least a portion of an engaging structure between the engagement part of the slider and the cartridge body makes a line contact between a protrusion or groove of the engagement part of the slider and the groove or the protrusion of the cartridge body, a magnet clamping hub having a hat-shaped portion disposed at a central portion of the disc cartridge, the hat-shaped portion has such a structure that the top end face of the hat-shaped portion is brought into contact with the inner surface of the upper half when a spindle of a disc driving device is inserted into the hub, disc receiving ribs are disposed each in an annular shape on the disc-containing wall surfaces of the upper half and the lower half at a position corresponding to the non-recording area at the inner circumferential portion of the disc to be contained, and at least one of the surface of said ribs and the corresponding surface of the inner circumferential portion of the disc is roughened, the lower surface of a shutter opening slot of the slider for receiving a shutter opening slot pin is situated at a position in flush with or below an upper end surface of a guide sliding portion of a half constituting a cartridge body so that the slot pin rotates on the upper end surface of the guide sliding portion, and the cartridge has a structure of closing the shutter in such a state that an end face of the slider is in contact with an end face of the sliding recess and a gap is present between an end face of the shutter and the cartridge body.

DETAILED DESCRIPTION OF THE INVENTION

Description will be made to an embodiment of a cartridge regarding a first aspect according to the present invention with reference to the drawings.

Figure 1:
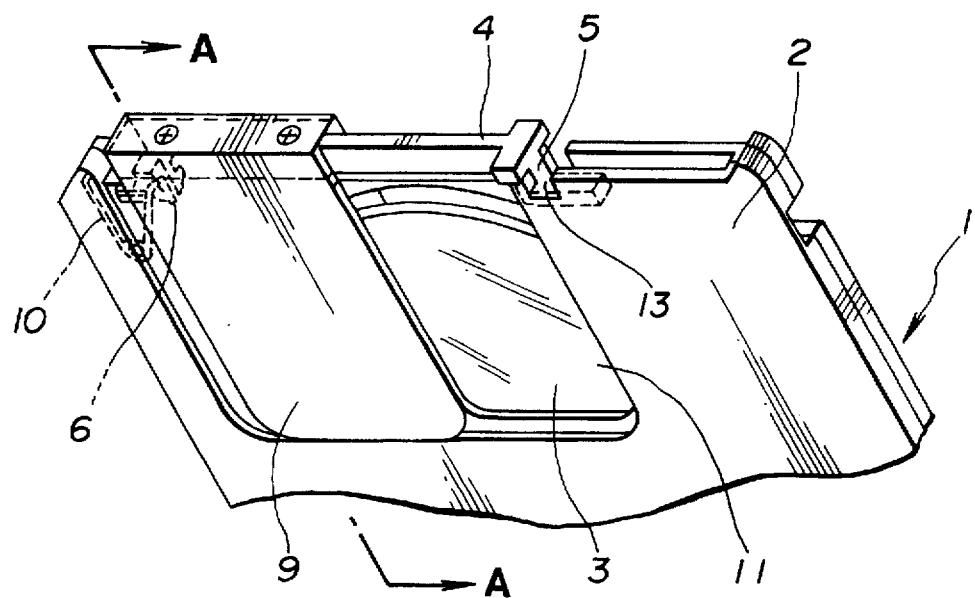
FIG. 1 is a perspective view for one embodiment of a cartridge according to the first aspect of the present invention.
Figure 2:
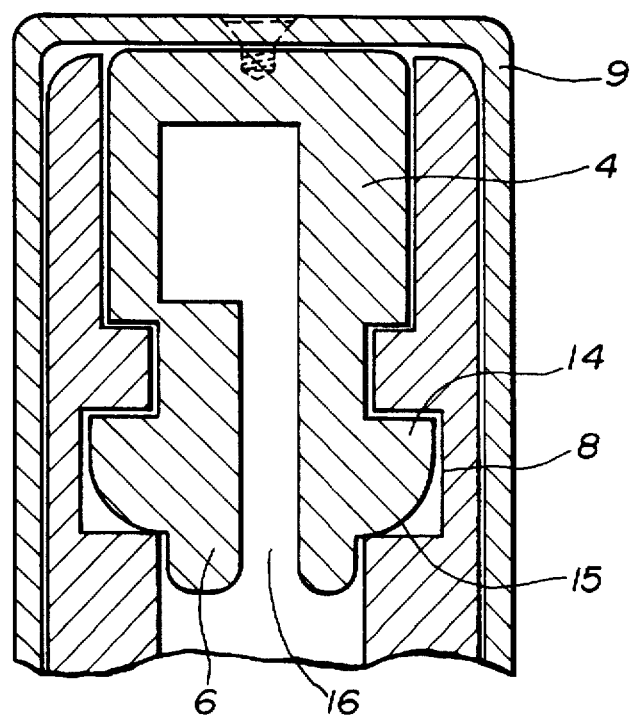
FIG. 2 is a cross sectional view taken along lines A—A in FIG. 1.
Figure 4:
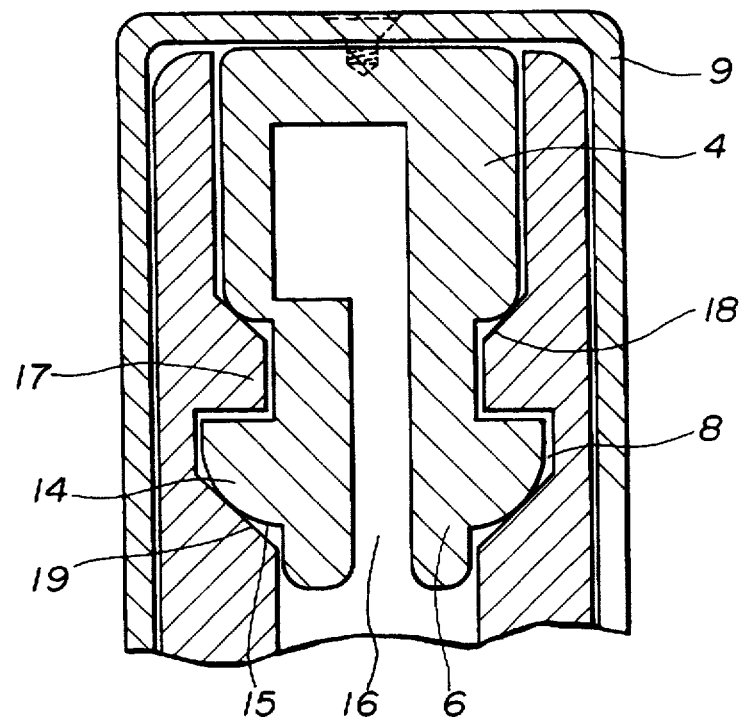
FIG. 4 is a cross sectional view of a further embodiment of the slider.
Figure 5:
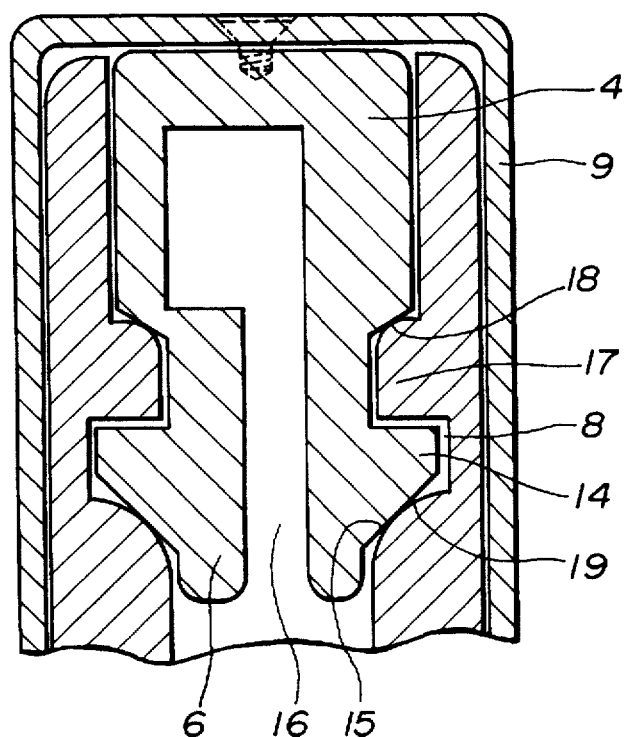
FIG. 5 is a cross sectional view of a still further embodiment of the slider.
Figure 6:
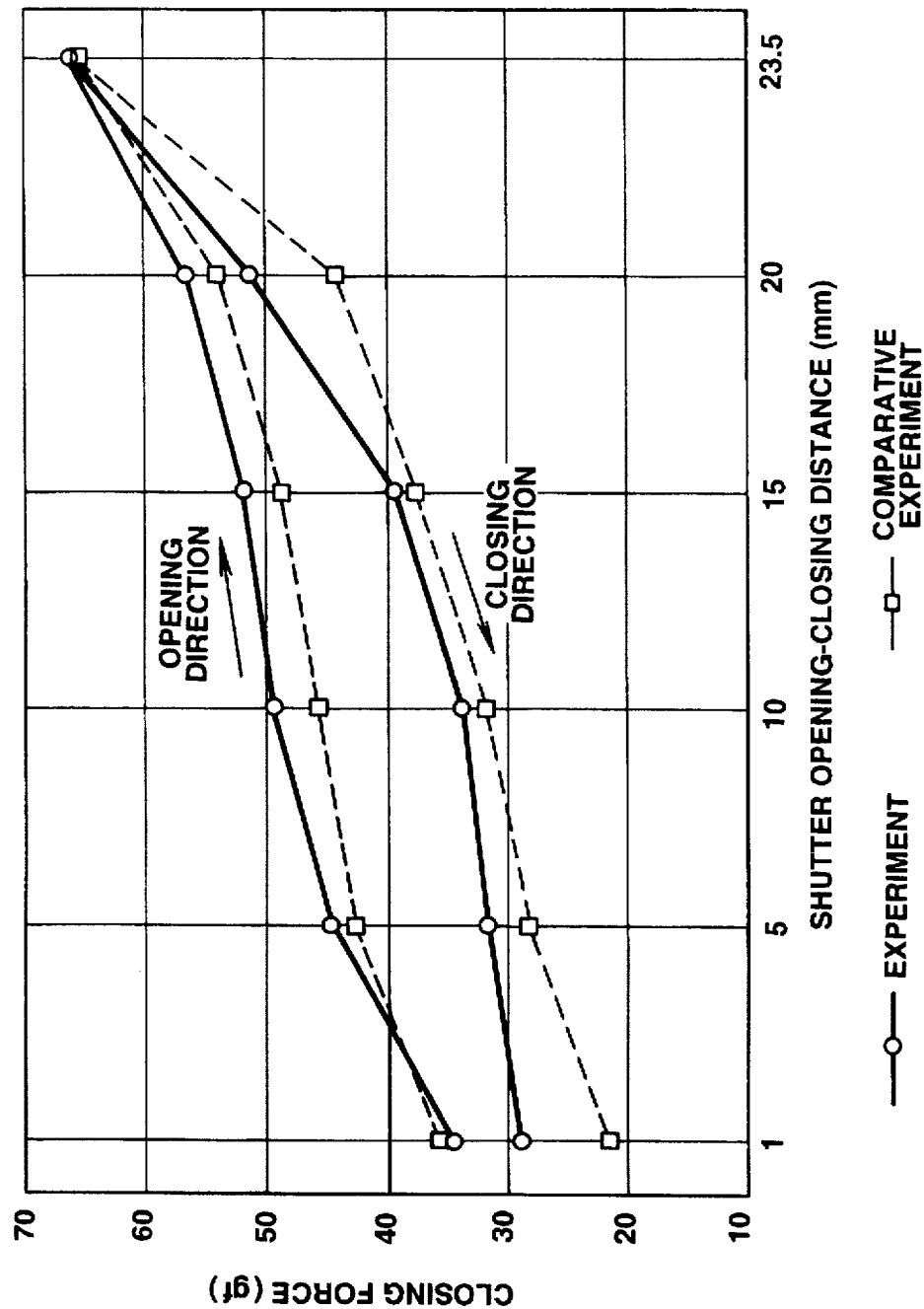
FIG. 6 is a diagram illustrating the closing force of a spring of the cartridge before opening/closing test.
Figure 7:
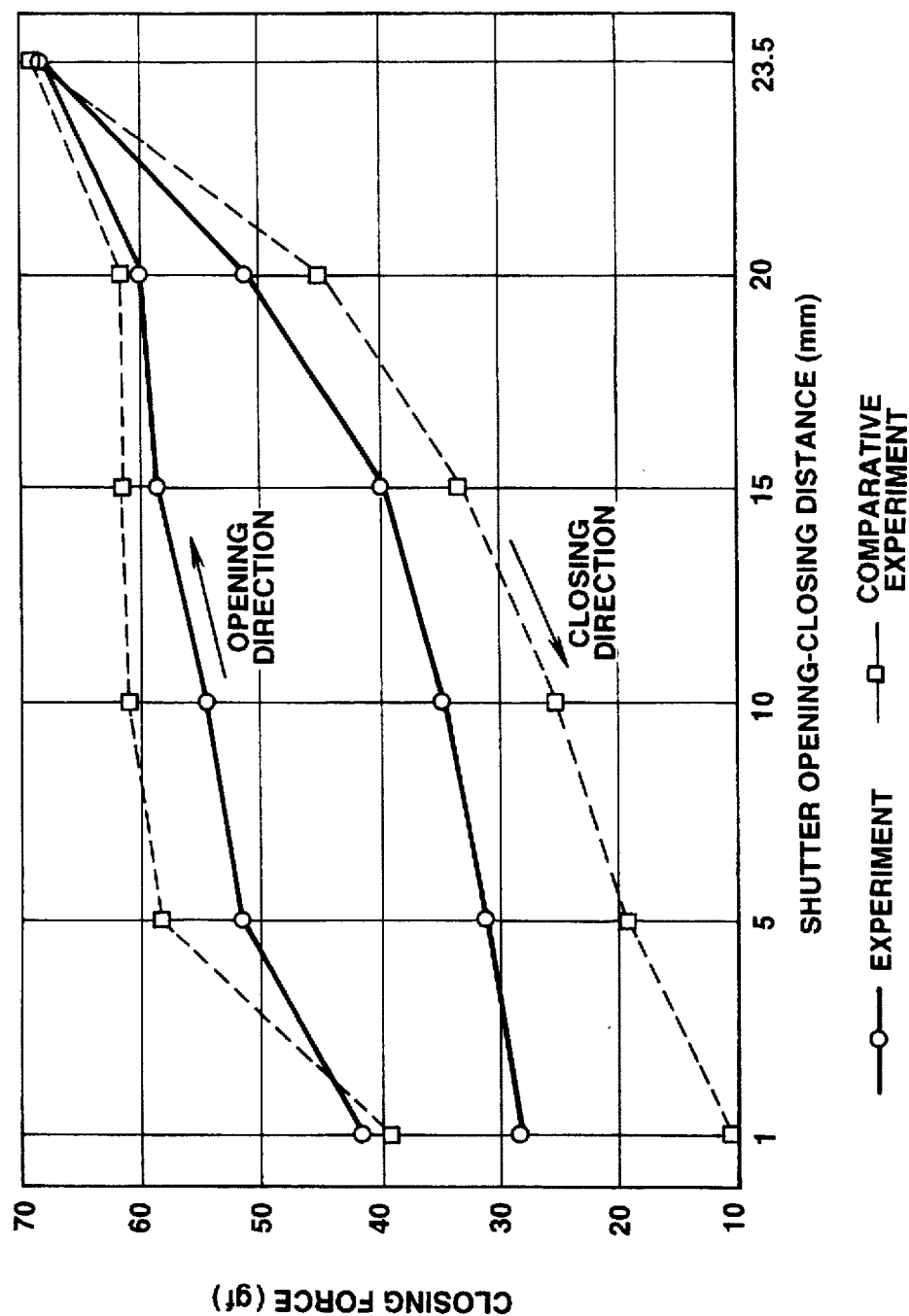
FIG. 7 is a view illustrating the closing force of the spring of the cartridge after opening/closing test.
Figure 8:
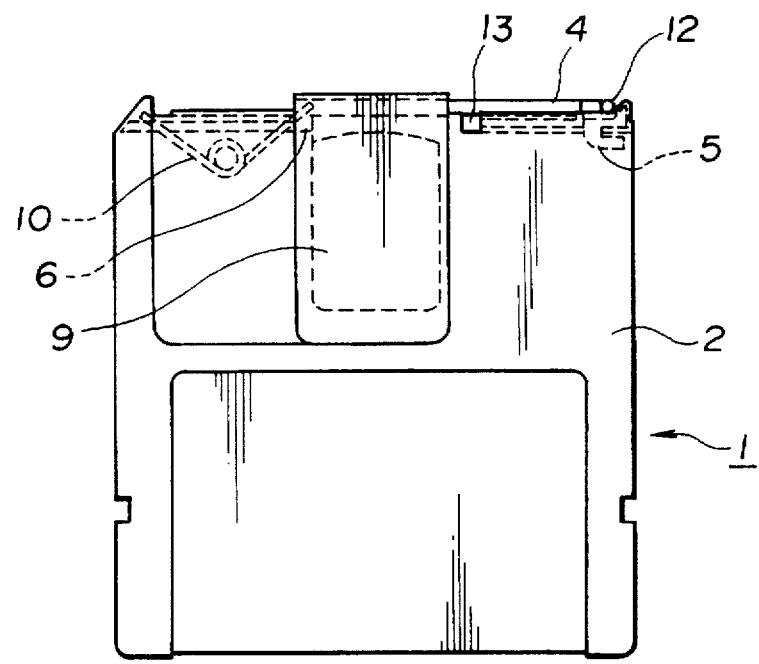
FIG. 8 is a front elevational view of a cartridge in the prior art (closed state)
Figure 9:
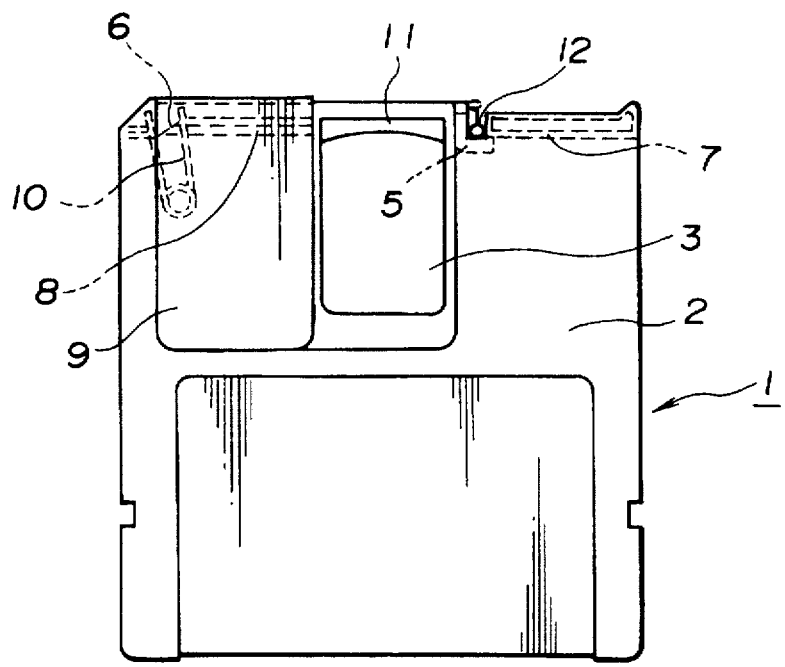
FIG. 9 is a front elevational view of a cartridge in the prior art (open state)

FIG. 1 is a perspective view illustrating a shutter portion in one embodiment of a cartridge according to the present invention, FIG. 2 is a cross sectional view taken along line A—A in FIG. 1, FIG. 3 to FIG. 5 are cross sectional views like that FIG. 2 of another slider, FIG. 6 is a view illustrating a relationship between a closing force (gf) of a spring of a shutter just after assembling a cartridge and a shutter opening-closing distance in experiments and comparative experiments. FIG. 7 is a view illustrating a relationship between a closing force (gf) of a spring of a shutter after opening/closing test conducted for 25,000 cycles, and a shutter opening-closing distance in experiments and comparative experiments, FIG. 8 is a front elevational view of a cartridge in the prior art (closed state), FIG. 9 is a front elevational view of a cartridge in the prior art (open state).

In FIG. 1, are shown disc cartridge 1, cartridge body 2, disc-shaped recording medium 3, slider 4, engagement part 5, 6, grooves (or protrusions) 7, 8, shutter 9, spring 10, opening portion 11, shutter opening/closing pin 12, recess portion 13, protrusion (or groove) 14, surface of protrusion 14 facing to the inside of the cartridge body, slit 16, protrusion 17, surface of protrusion 17 facing to the outside of the cartridge body and wall surface 19 of groove 8, respectively.

As shown in FIG. 1, the cartridge body 1 has an opening portion 11 formed about at a middle portion in a half constituting the cartridge body for inserting, for example, a recording/reading out head. The slider 4 is molded from a synthetic resin and has engagement part 5, 6 on both ends of the slider 4. Namely, the slider 4 comprises a rod member disposed along one side of the cartridge and engagement part protruded on both ends of the rod member for engagement with the groove or protrusion of the cartridge body 2. As shown in FIG. 2 which is a cross sectional view taken along line A—A in FIG. 1, the groove (or protrusion) 8 is disposed along one side of the cartridge body 1, to which the protrusion (or groove) 14 of the engagement part 5, 6 are engaged. Namely, the slider 4 is slidably engaged along one side of the cartridge body 1.

As shown in FIG. 2, the surface 15 of the protrusion 14 of the engagement part of the slider 4 facing the inside of the cartridge body 1 is formed as a wedge-shaped inclined surface as shown in the figure to make a structure in which the protrusion 14 and the groove 8 of the cartridge body 1 are brought into a line contact with each other. Such a line contact structure can reduce the resistance of the slider 4 upon sliding movement and can prolong the working life of the spring 10.

For the spring 10 as the restoring means, a structure comprising a pair of arms in a V-shaped configuration and coils integrated at the central portion of the arms is illustrated, but a spring of any other structure may be used. It is preferred to engage the one end of the spring with the end of the shutter, and further, one end of the spring may be engaged preferably with the shutter. The engagement part 6 has a slit structure with the slit 16 in the direction along sliding direction. Further, since the surface 15 of the protrusion 14 of the engagement part 6 facing to the inside of the cartridge is formed as a wedgeshaped inclined surface, the engagement part 6 can be assembled by inserting forcibly the engagement part 6 from outside of the cartridge with the slit 6 functioning as a deforming portion. The structure of having such a slit 16 capable of being inserted forcibly may be adopted for another engagement part 5. If the engagement part 5 has a structure capable of being inserted into the groove 7 of the cartridge from the recess 13 formed on the cartridge body 1, it is not necessary to adopt such a structure as capable of inserting forcibly, namely, a structure having a slit.

That is, one engagement part 5 of the slider 4 is inserted from the recess 13 of the cartridge body 1 to be engaged with the groove 7 and then another engagement part 6 of the slider is engaged with the groove 8 by forcing from the outside of the cartridge.

Figure 3:
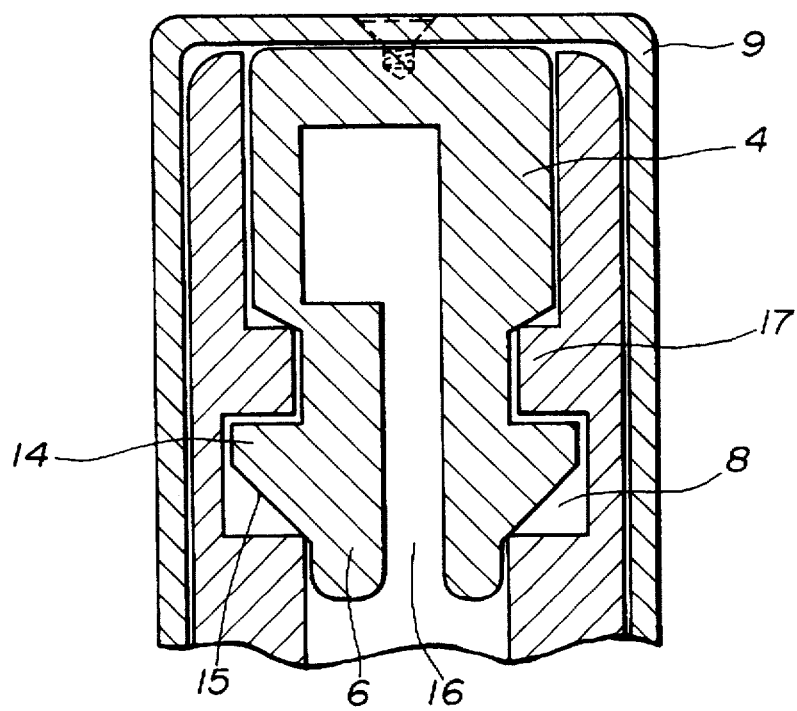
FIG. 3 is a cross sectional view of another embodiment of the slider.

The engaging structure between the cartridge body 2 and the slider 4 is not limited only to the embodiment shown in FIG. 2 providing that the structure makes a line contact. For instance, any of structures can be selected, for example, as shown in FIG. 3, in which a linear inclined surface (surface 15 directing to the inside of the cartridge), and as shown in FIGS. 4 and 5, in which the wall surface 19 of the groove 8 of the cartridge body 2 is formed as an inclined surface. Further, the shape of the inclined surface is optional such as a flat surface or curved surface. It is only necessary that engagement between the protrusion 14 and the groove 8 makes not a face contact but a line contact so as to reduce the sliding resistance. Further, as shown in FIG. 4, if the surface 18 of the engaging protrusion 17 disposed to the cartridge body 2 directing to the outside of the cartridge body 2 is formed as an inclined surface directing to the inside of the cartridge, a line contact structure is obtained, and the slider can be inserted smoothly upon enforcing engagement.

Description will then be made to a disc cartridge of a second aspect according to the present invention with reference to the drawings.

Figure 10:
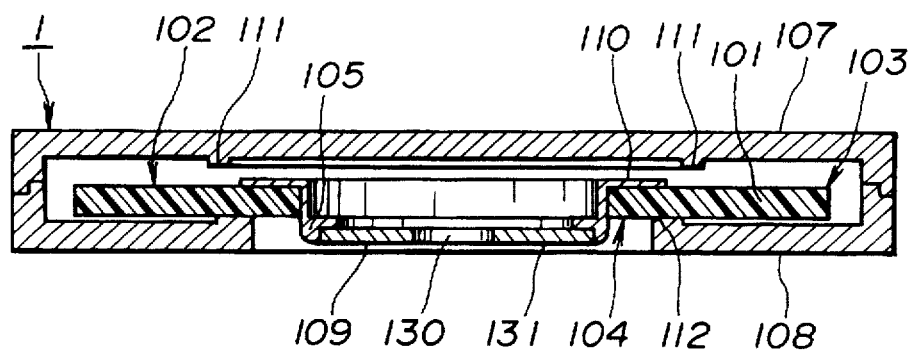
FIG. 10 is a vertical cross sectional view of a cartridge according to the second aspect of the present invention.
Figure 11A:
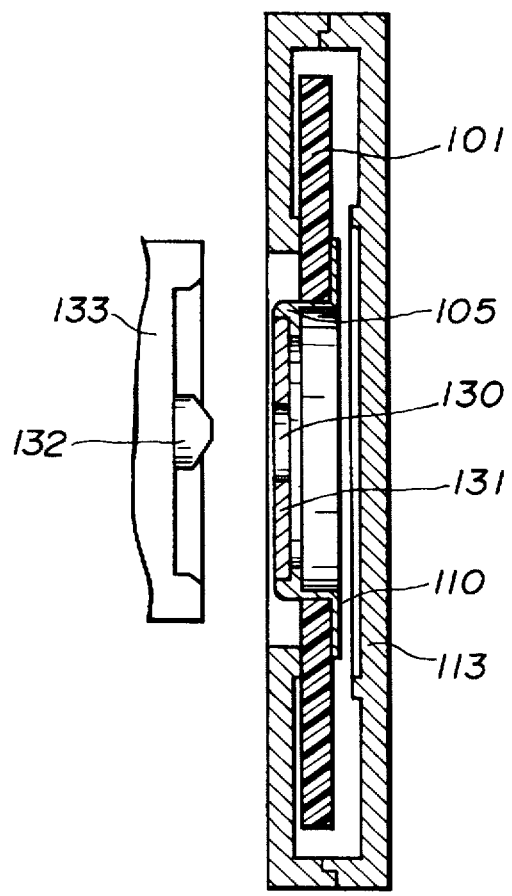
FIG. 11(a) and FIG. 11(b) are vertical cross sectional views of a cartridge according to the present invention.
Figure 11B:
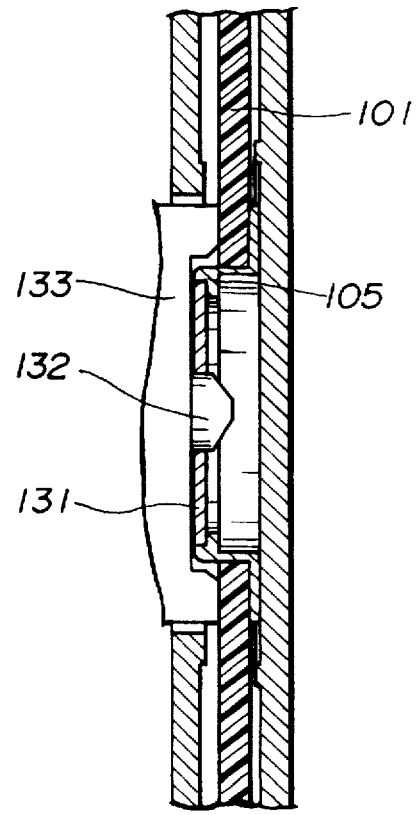
Figure 12:
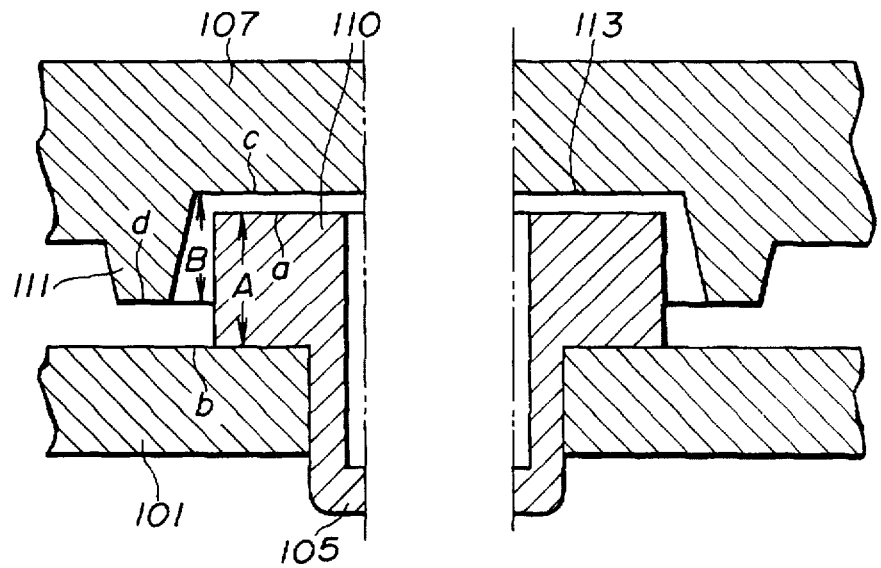
FIG. 12 is an enlarged cross sectional view of a hub.

FIG. 10 is a vertical cross sectional view of a disc cartridge (cartridge in a state containing disc), FIG. 11(a)

and FIG. 11(b) is a vertical cross sectional view illustrating a relation between a driving device and a disc cartridge. FIG. 12 is an enlarged vertical cross sectional view of a hub.

In the drawings, a disc 101 comprises a recording region 102, a non-recording region 103 at the outer circumferential portion and a non-recording region 104 at an inner circumferential portion, and a hub 105 for a magnet clamp (chuck) is disposed on a central portion. The disc 101 used preferably comprises, for example, a disc substrate made of a polycarbonate resin and an information signal recording layer disposed on the disc substrate.

A disc cartridge 1 rotatably contains the disc 101 at the inside and it is formed by injection molding of a synthetic resin having a good moldability and a sufficient mechanical strength such as a polycarbonate resin or ABS resin. The cartridge body comprises an upper half 107 and a lower half 108, and formed in a state of abutting against each other and joining by means of screwing or the like while containing the disc 101. Disc receiving ribs 111, 112 are disposed usually each in a ring-shaped configuration to the upper half 107 and the inner surface surrounding the insertion port 109 of a clamp portion of the lower half 108 of the cartridge body, corresponding to non-signal recording region 104 at the inner circumferential portion of the disc 101. The ribs 111, 112 may be in a partially depleted ring-shaped configuration (annular shape).

The magnet clamping hub 105 used in the present invention comprises an annular magnetic member 131 formed by integrally insert molding a resin at the outer circumferential portion, in which a hat-shaped portion 110 is disposed to the outer circumference of the hub 105 for facilitating mounting to the disc 101. The hat-shaped portion 110 of the hub 105 is attached to the inner circumferential surface 104 of the disc 101, for example, by means of adhesion or supersonic welding.

As shown in FIG. 11, in the structure of the present invention, when the disc cartridge is disposed in a vertical direction (FIG. 11(a)), and a spindle 132 of the driving device is inserted laterally into an spindle insertion port 130 of a hub 105, the top end surface of the hat-shaped portion 110 is in contact with the inner surface 113 of the upper half 107 (FIG. 11(b)). Therefore, as shown in FIG. 11(b), when a disc receiving rib 111 is disposed to the inner surface 113 of the upper half 107, the top end surface of the hat-shaped portion 110 of the hub is in contact with the inner surface 113 of the upper half prior to contacting of the disc 101 with the disc receiving rib 111. That is, as shown in FIG. 12, it is necessary that a distance (A) between the top end surface (a) of the hat-shaped portion 110 of the hub 105 and the recording surface (b) of the disc is greater than a distance (B) between the inner surface (c) of the upper half 107 and the top end (d) of the disc receiving rib 111. It is suitable that the value: [(distance A)−(distance B)] is within a range more than 0, preferably not less than 0.01 mm, more preferably not less than 0.05 mm, most preferably not less than 0.10 mm.

In the present invention, as described previously, since the top end of the hat-shaped portion 110 of the hub 105 is in contact with the inner surface of the upper half 107 when the spindle 132 of the driving device is inserted into the spindle insertion portion port 130 of the hub 105 of the disc cartridge, the disc receiving rib 111 may be removed. That is, since it has a structure that the top end of the hat-shaped portion 110 of the hub 105 is in contact with the inner surface of the upper half 107, the injury to the signal recording surface of the disc, caused by contact between the disc 101 contained and the cartridge body can be prevented.

Further, in the present invention, it is preferred to apply a roughening-treatment to be described later to the surface of the halt-shaped portion 110 of the hub 105 in contact with the inner surface of the upper half 107 to make the roughness ($R_{max}$) of the treated surface to 5–50 μm, preferably 10 to 30 μm.

Then, description will be made to a cartridge of a third aspect according to the present invention with reference to the drawings.

Figure 13A:
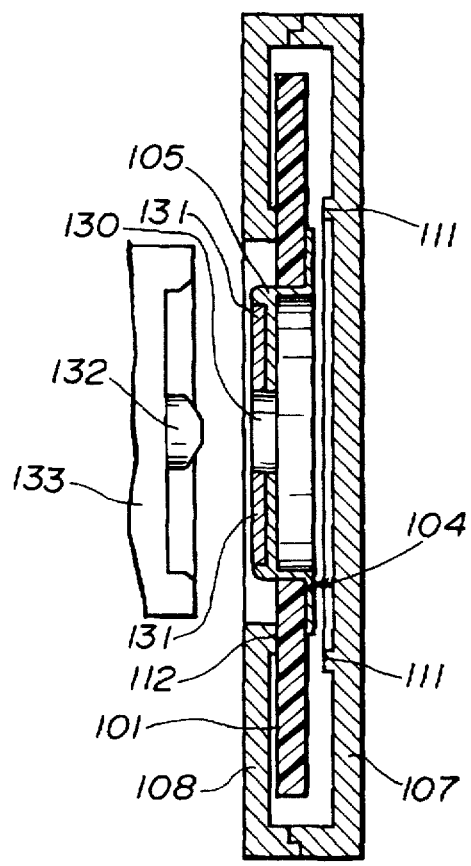
FIG. 13(a) and FIG. 13(b) are vertical cross sectional views illustrating a relationship between a driving device and a cartridge according to the third aspect of the present invention.
Figure 13B:
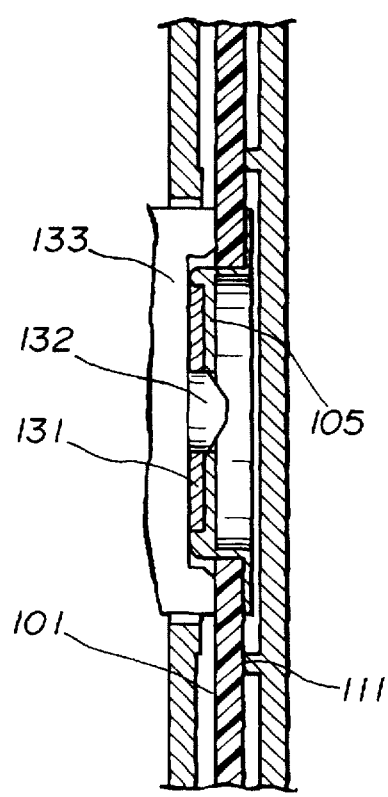
Figure 14A:
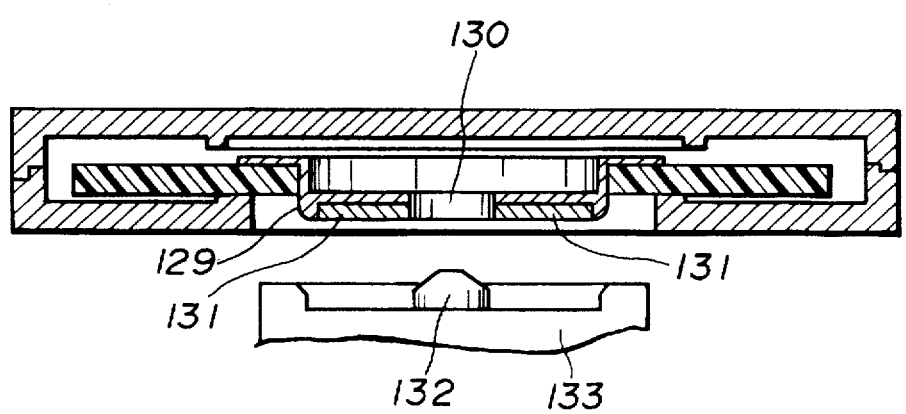
FIG. 14(a) and FIG. 14(b) are cross sectional views of a cartridge in the prior art.
Figure 14B:
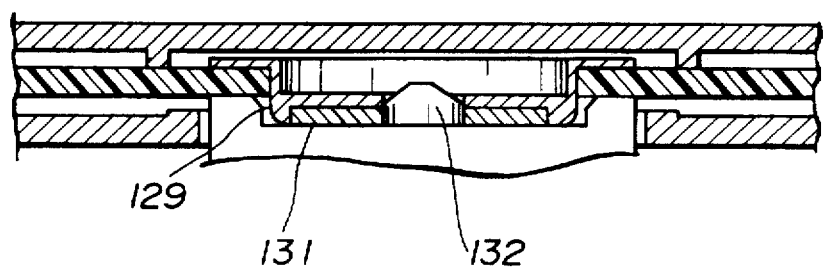
Figure 15A:
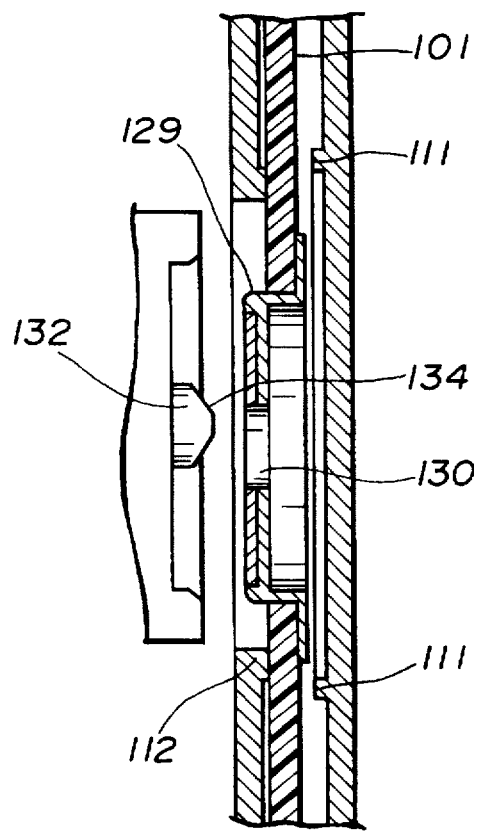
FIG. 15(a) to FIG. 15(d) are vertical cross sectional views illustrating states of using the cartridge in the prior art.
Figure 15B:
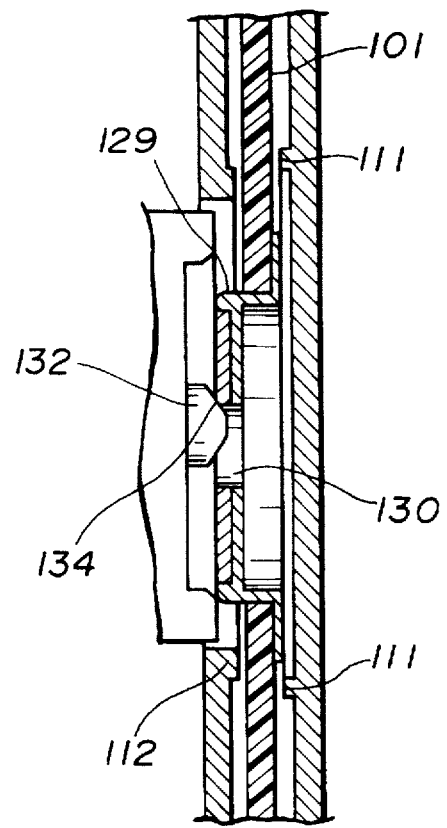
Figure 15C:
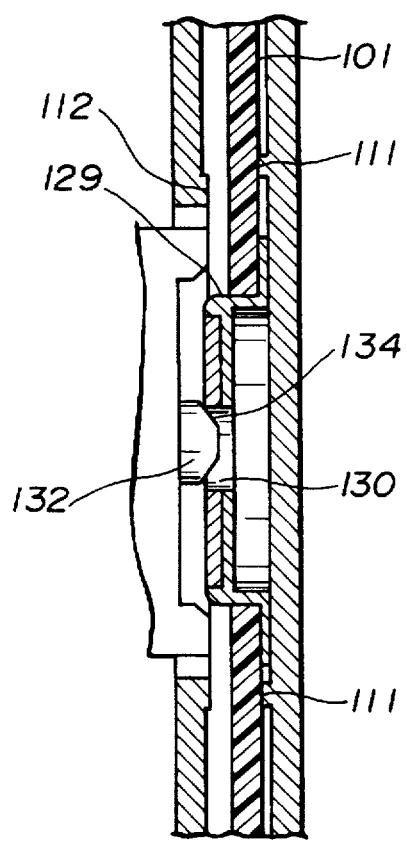
Figure 15D:
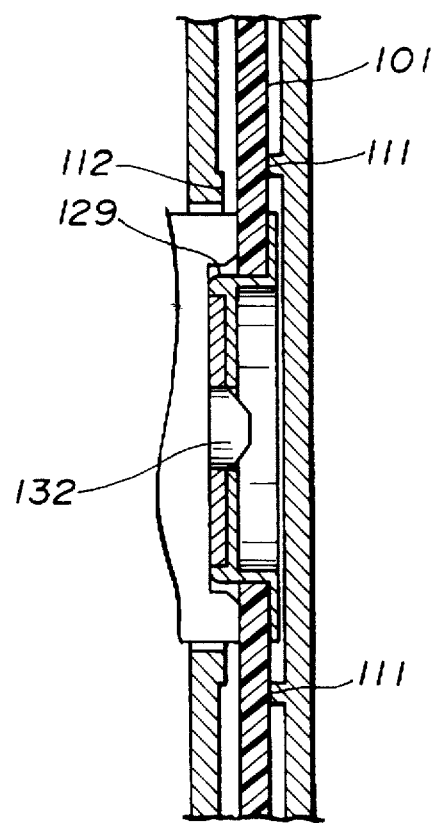
Figure 16:
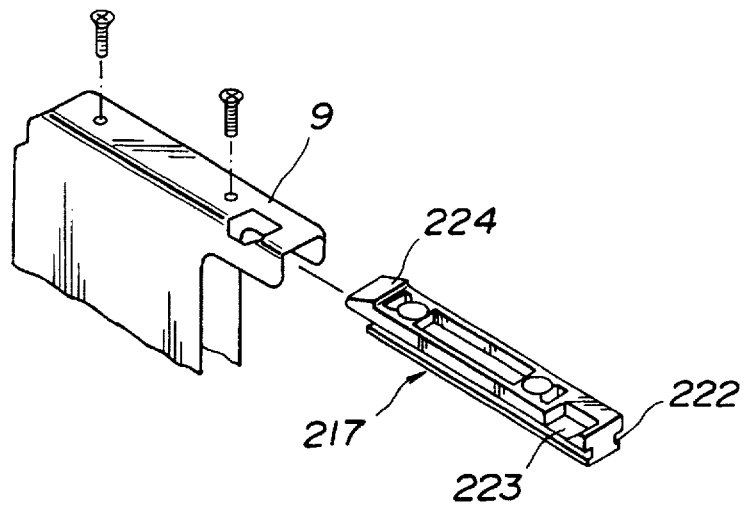
FIG. 16 is an enlarged perspective view of a shutter and a slider.

FIG. 13 is a vertical cross sectional view for a relationship between a driving device and a cartridge of a third aspect according to the present invention.

Disc receiving ribs 111, 112 are disposed at the inner wall surface of the upper half 107 and lower half 108, which corresponds to a non-recording region 104 at an inner circumferential portion of a disc 101 contained, preferably at a region within a range from the outside of an abutting position of the inner circumferential non-recording region 104 against the clamp mechanism to the outermost circumference of the non-recording region 104. The ribs 111, 112 are provided on the corresponding position of inner wall surface of the upper half 107 and the lower half 108 (disc containing side wall surface), each with a width of not less than 0.5 mm, preferably 1 to 13 mm and, more preferably 1 to 10 mm, and in an annular shape. The height (H) of the ribs 111, 112 varies depending on the thickness of the disc and the wall thickness of the upper and lower half members, but may be any height as capable of keeping the disc 101 from contact with the inner wall surface of the cartridge and it is usually from 0.1 to 1 mm.

As the magnet clamping hub 105 used therein, there can be mentioned, for example, a metal hub or a hub formed by integrally insert-molding a resin on the outer circumference of the annular magnetic member 131 as shown in FIG. 10 and disposing a hat-shaped portion 110 at the outer circumference of the hub 105 for facilitating the mounting to the disc.

In the present invention, the roughening-treatment is applied to at least one surface of the receiving rib 111 against which the disc 101 is abutted when pushed by the spindle 132, and the surface of the surface of the disc corresponding (in contact with) the rib 111 (a portion in contact with the non-recording region 104) to prevent close contact between both of them at the contact portion between the hub and the inner surface of the disc.

As the roughening-treatment, there can be mentioned, for example, an embossing-treatment using electric discharge, blasting-treatment (sand blast), honing-treatment by grinding or polishing with particles or electric discharge processing-treatment. The roughening-treatment may be applied either to the surface of a molding die or directly to the surface of the molding product (rib surface of the cartridge or the disc surface in contact with the rib). As the extent of the roughening treatment, the roughness ($R_{max}$) of the treated surface is suitably within a range from 5 to 50 μm, more preferably from 10 to 30 μm.

Description will then be made to a disc cartridge of a fourth aspect according to the present invention with reference to the drawings.

In FIG. 16 to FIG. 19, a slider 217 has an engaging groove 222 as a guide formed on a lateral side in a longitudinal direction for engagement with a sliding recess portion 218 (guide sliding portion) of a cartridge body 2. The slider 217 has a shutter opening slot 223 at one end thereof for engagement with a slot pin (roller) 226a at an end of a first shutter opening lever 226 and an inclined portion 224 formed at the other end thereof on which a slot pin 227a at an end of a second shutter opening lever 227 rotates.

In the disc cartridge of the present invention, when a disc cartridge is inserted and loaded in a disc driving device, as shown in FIG. 18(a), FIG. 18(b), FIG. 19(a) and FIG. 19(b), the slot pin 226a at the end of the first shutter opening lever 226 enters the shutter opening slot 223 of the slider 217 to push the shutter opening slot 223 while the slot pin 227a at the end of the second shutter opening lever 227 rotates from the inclined portion 224 on the surface of a shutter connection portion 216. When the cartridge body 2 is further thrust from this state into the disc driving device, the first shutter opening lever 226 rotates in the direction of an arrow A in FIG. 17 and the second shutter opening lever 227 rotates in the direction of an arrow B in FIG. 17, and the slider 217 and the shutter 9 are opened in the direction of an arrow C by the first shutter opening lever 226.

Figure 17:
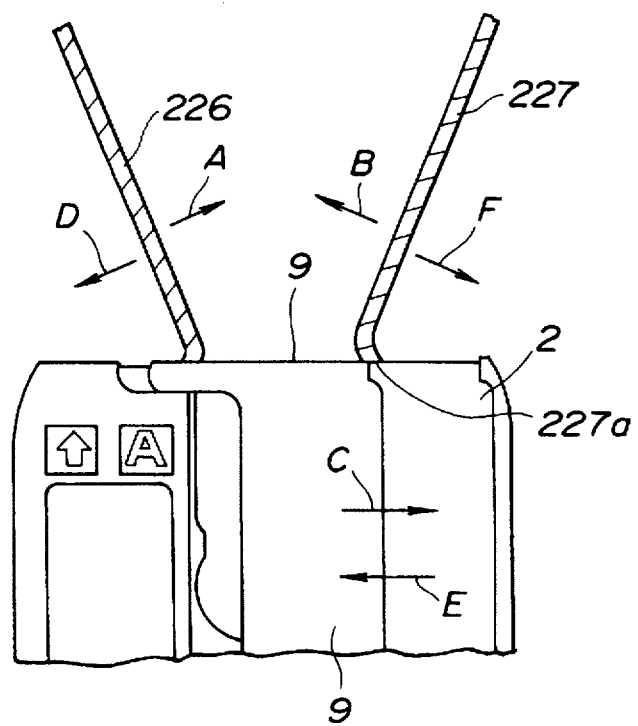
FIG. 17 is an explanatory view illustrating a relationship between a cartridge and a shutter opening lever.

In a case of closing the shutter 9, when the cartridge body is retracted from the disc driving device, the first opening lever 226 rotates in the direction opposite to that for insertion, that is, in the direction of an arrow D in FIG. 17, by which the shutter 9 moves in the direction of an arrow E in FIG. 17, namely, in the direction of closing the shutter 9. In this instance, the second shutter opening lever 227 also rotates in the direction opposite to that for insertion, namely, in the direction of an arrow F in FIG. 17 and returns to an initial position. Thus, the two shutter opening levers 226 and 227 are disposed, because the use of a both side recording disc is assumed here. When the cartridge is loaded to the disc driving device, but with a surface B at the rearface, instead of the surface A shown in FIG. 17, being upside, the operational relationship between both of the members is reversed, in which the second shutter opening lever 227 pushes the shutter opening slot 223 and the first shutter opening lever 226 rotates from the inclined portion 224 on the surface of the shutter connection portion 216.

Figure 18A:
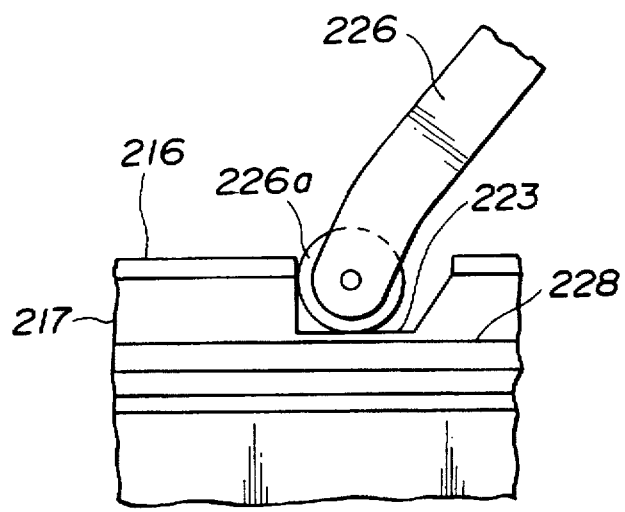
FIG. 18(a) and FIG. 18(b) are explanatory views illustrating a relationship between a slider and a slot pin of the prior art.
Figure 18B:
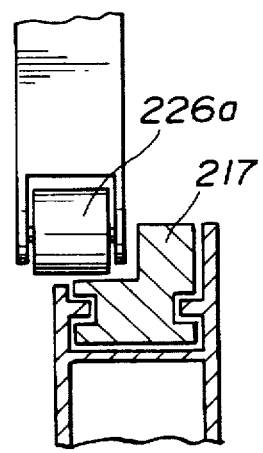

When the disc cartridge 2 of the prior art is inserted and loaded in the disc driving device, as shown in FIG. 18(a), FIG. 18(b), the slot pin 226a at the end of the first shutter opening lever 226 is inserted into the shutter opening slot 223 and the slot pin 226a pushed the slot 223, thereby causing the slider 217 to slide in the direction of an arrow A and opening the shutter 9 in the direction of the arrow C. In the structure of the slider 217 of the prior art shown in FIG. 18(a), FIG. 18(b), an excess force exerts on the shutter opening lever 226 upon starting shutter opening and the shutter opening lever is gradually deteriorated to cause operation failure as loading/unloading operations are repeated frequently in use. The problem results from the structure of the shutter opening slot 223 disposed to the slider 217. That is, this is attributable to that the lower surface of the shutter opening slot 223 situates above the upper end surface 228 of the guide sliding portion of a cartridge half as shown in FIG. 18(a), FIG. 18(b) and it is considered that the slot pin 226a can not rotate smoothly in such a structure and rattling of the slider 217 is transmitted directly to the lever 226.

Figure 19A:
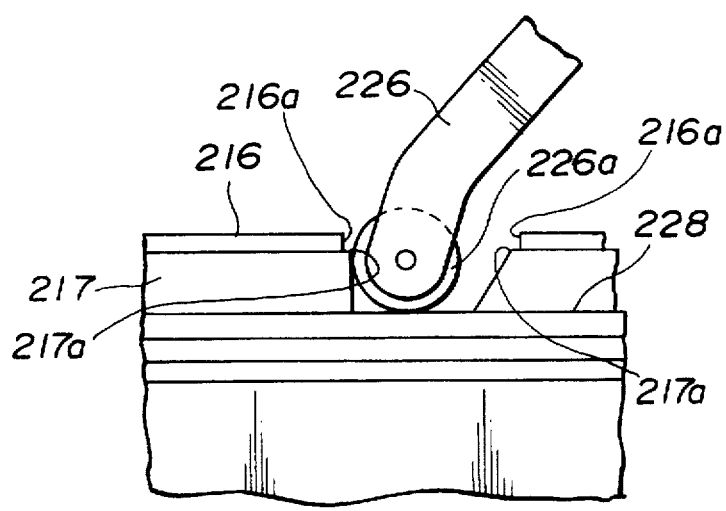
FIG. 19(a) and FIG. 19(b) are explanatory views illustrating a relationship between a slider and a slot pin according to the fourth aspect of the present invention.
Figure 19B:
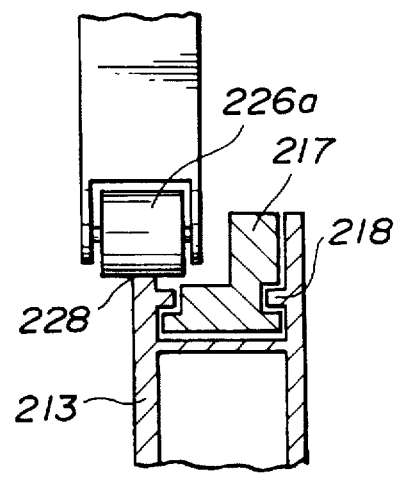

In the present invention, as shown in FIG. 19(a), FIG. 19(b), the shutter opening slot 223 of the slider 217 is recessed more deeply than that of the prior art such that the lower surface of the shutter opening slot situates below or in flush with the upper end surface 228 of the guide sliding portion (sliding recess) 218 of a cartridge half 213. Accordingly, when the slot pin 226a at the end of the shutter opening lever 226 is inserted into the shutter opening slot 223, it moves while running stably along the upper end face 228 of the guide sliding portion (sliding recess) 218 and causes the slider 217 to move slidingly, so that a force exerting on the shutter opening lever 226 upon starting the shutter opening can be reduced remarkably, thereby increasing the life of the shutter opening lever.

By the way, when a force exerting on the shutter opening lever 226 was measured when the disc cartridge having the shutter opening slot 223 shown in FIG. 19(a) and FIG. 19(b) is inserted and loaded to the disc driving device, it was 0.6 kgf at the maximum.

On the contrary, in a case of using the disc cartridge having the shutter opening slot 223 shown in FIG. 18(a) and FIG. 18(b) (in the prior art cartridge), the maximum value of the force exerting on the shutter opening lever 226 was 0.9 kgf.

Further, in order to avoid to contact the slot pin 226a with the shutter connection portion 216 in the shutter opening slot 223 of the slider when opening, an end 216a of the shutter connection portion 216 facing the shutter opening slot 223 is positioned backward an upper end 217a of the slider 217 facing the shutter opening slot 223, thereby preventing occurrence of the scrapping dusts.

Description will then be made to a disc cartridge of a fifth aspect according to the present invention with reference to the drawings.

Figure 20:
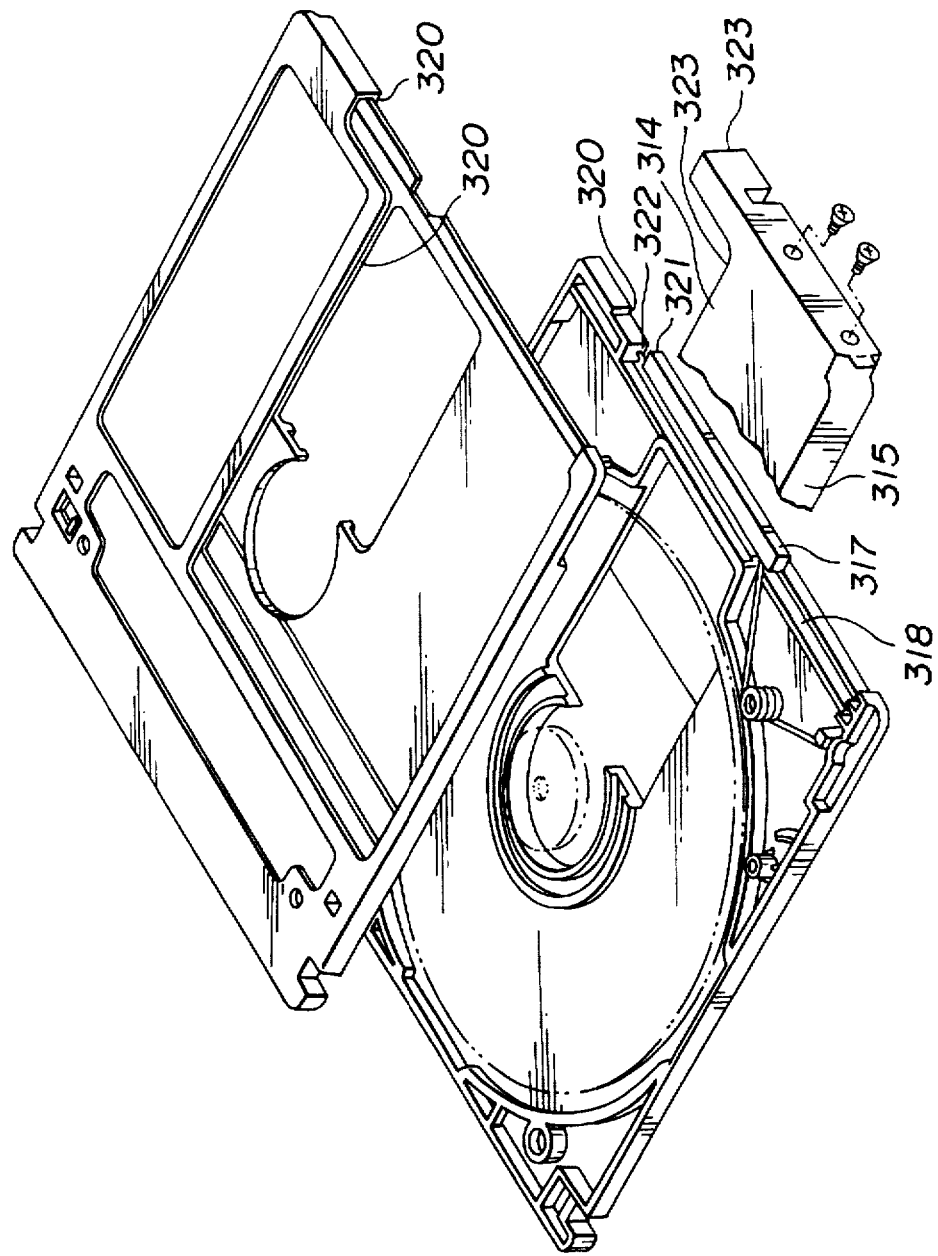
FIG. 20 is an exploded perspective view of a cartridge according to the fifth aspect of the present invention.

In accordance with the present invention as shown in FIG. 20, before a shutter 314, 315 is brought into contact with a raised wall 320 of a sliding recess 318 of a cartridge body by way of a slider 317 by means of resilient force of a spring, that is, in a state where a slight gap is formed between an end surface of the shutter 314, 315 and the cartridge body, and an end face 321 of the slider 317 is brought into contact with an end face 322 of the sliding recess 318 of the cartridge body to make the slider stationary.

In a state where the shutter 314, 315 is closed stationary, a gap is formed between the raised wall 320 of the sliding recess 318 and an end face 323 of the shutter 314, 315. The gap is, preferably, a very narrow gap so long as it is within such a range as not exposing the opening surface with no contact of the end face 323 of the shutter to the raised wall 320 and it is usually about from 0.1 to 0.5 mm.

In the present invention, each of the technical problems can be solved by each of the aspect selected from the first aspect to the fifth aspect, or the combined technical problems can be solved together by the combination of at least two aspects selected from the first aspect to the fifth aspect.

In accordance with the present invention, since the slider 3 is shaped such that the area of contact with the cartridge body is decreased, the sliding resistance is reduced, whereby the working life of the spring can be prolonged. Further, since it can provide a structure capable of inserting the slider after assembling the cartridge body, the assembling operation is facilitated.

The disc cartridge in accordance with the present invention, even if it is used in a vertical direction, causes no chuck failure or no abnormal sounds.

In accordance with the present invention, since at least a portion of the rib surface of the disc cartridge, or the corresponding inner surface of the disc is roughened, the disc can be centered quite satisfactorily with no close contact when the inner surface of the disc is in contact with the rib surface upon insertion of the spindle of the disc driving device to the hub surface of the disc cartridge, so that generation of abnormal sounds or damages to the disc due to chuck failure can be prevented, and further, the occurrence of operation failure of the driving device can also be prevented.

Since the disc cartridge according to the present invention has such a structure that the force exerting on the slot pin 226a on the driving side is moderated upon opening/closure of the shutter, it can provide an advantageous effect of increasing the life of the slot pin.

Since the material used for the slider 317 is a synthetic resin, preferably, a polyacetal resin or a resin identical with that of the cartridge body, and in addition, since the end face 323 of the slider 317 is in a face-to-face contact with the end face 322 of the sliding recess in view of the structure, this can prevent occurrence of scraping dusts at the surface of contact as in the prior art. In according with the present invention, there is provided a cartridge resulting less powder of scraping dust caused by opening/closure of the metal shutter and free from a worry of error in the recording medium.

EXPERIMENT

Experiments will be shown below but the invention is not restricted to the following experiments so long as it does not go out of the gist of the invention.

EXPERIMENT 1, COMPARATIVE EXPERIMENT 1

A cartridge used for 3.5 inch optical disc in which a polycarbonate slider and an aluminum shutter are attached to a polycarbonate cartridge body was used.

Opening/closing test was conducted for 25,000 cycles on a cartridge according to a present invention shown in FIGS. 1 and 2, and on a cartridge in which the protrusion 14 shown in FIG. 2 was replaced with the existent protrusion, namely, a protrusion of the same shape as the groove 8. No reduction was observed for the or closing force of the spring in a case of the cartridge according to the present invention.

In the cartridge according to the present invention, the closing force at 35 gf upon starting the opening before the 25,000 cycles opening/closing test became 42 gf after the 25,000 cycles opening/closing test, and the closing force at 29 gf in a closed state before the 25,000 cycles opening/closing test became 28 gf after the 25,000 cycles opening/closing test.

On the other hand, in a case of the conventional cartridge, the closing force at 36 gf upon starting the opening before the 25,000 cycles opening/closing test became 39 gf after the 25,000 cycles opening/closing test, and the closing force at 22 gf in a closed state before the 25,000 cycles opening/closing test became 10 gf after the 25,000 cycles opening/closing test.

Results are shown in FIGS. 6 and 7.

EXPERIMENTS 2 to 4, COMPARATIVE EXPERIMENT 2, 3

A disc cartridge shown in FIG. 12 having a structure in which the difference between the distance (A) from the end (a) of the hat-shaped portion 110 of the hub 105 to the recording surface (b) of the disc, and a distance (B) from the inner surface (c) of the upper half 107 to the end (d) of the disc receiving rib 111 is in such a relation as shown in Table 1 was disposed vertically and the spindle 120 of the driving device was inserted into the hub 105 from the lateral direction. Generation of abnormal sounds upon chucking was examined and results are shown in Table 1.

TABLE 1

|  | Value for A–B (mm) | Abnormal sounds upon checking |
|---|---|---|
| Experiment 2 | 0.05 | None |
| Experiment 3 | 0.14 | None |
| Experiment 4 | 0.16 | None |
| Comparative Experiment 2 | 0.00 | Present |
| Comparative Experiment 3 | –0.02 | Violent sounds |

EXPERIMENT 5

A disc cartridge as shown in FIG. 10 in which embossing was applied to the surface of the disc receiving rib 111 to roughen the surface to the roughness ($R_{max}$) of 20 µm, was disposed vertically, and the spindle 120 of the driving device was inserted laterally into the hub 105. The disc could be centered quite satisfactorily and no abnormal sounds were generated upon chucking.

COMPARATIVE EXPERIMENT 4

As a result of experiment conducted in the same manner as in Experiment 5 except for using the rib 111 having the surface not applied with embossing-treatment, close contact resulted between the inner surface of the disc and the surface of the rib, failing to conduct satisfactory centering of the disc and generating violent abnormal sounds upon chucking.

What is claimed is:

1. A disc cartridge containing a disc-shaped recording medium, said disc cartridge comprising:
    a cartridge body having an opening portion for exposing a portion of a surface of the disc-shaped recording medium contained therein;
    a shutter for covering and uncovering the opening portion;
    a slider for supporting the shutter, disposed on the cartridge body for sliding thereon;
    a spring for resiliently restoring the slider and the shutter to the covering position; and
    the slider having an engagement part facing an inside of the cartridge body, the engagement part formed as a wedge-shaped inclined surface, the cartridge body having a corresponding groove or protrusion formed along a side thereof for engaging the engagement part, the engagement part of the slider being engaged to the groove or protrusion solely by a line contact therebetween.

2. The disc cartridge of claim 11, wherein the engagement part of the slider is divided by a slit which extends along a sliding direction of the slider.

3. The disc cartridge of claim 1, wherein the wedge-shaped inclined surface is inclined in a direction tapering towards the inside of the cartridge body.

4. The disc cartridge according to claim 1, wherein the cartridge body has an upper half and a lower half, and rotatably supports the disc-shaped recording medium therein, a magnet clamping hub having a hat-shaped portion disposed at a central portion of the disc cartridge for receiving a spindle of a driving device therein, a plurality of annular-shaped disc receiving ribs on disc containing wall surfaces of the upper half and the lower half, positioned adjacent to a non-recording area at an inner circumferential portion of the disc-shaped recording medium, at least one of the surfaces of the ribs and a corresponding adjacent surface of the inner circumferential portion being roughened.

5. A The disc cartridge according to claim 1, wherein the slider is slidably disposed on one side edge of the disc cartridge, the shutter being secured to the slider, the slider having a shutter opening slot having a lower surface for receiving a shutter opening slot pin, the lower surface positioned flush with or below an upper end surface of a guide sliding portion of a half of the cartridge body, the slot pin rotated on the upper end surface of the guide sliding portion.

6. The disc cartridge according to claim 1, wherein when the shutter covers the disc-shaped recording medium, an end face of the slider is in contact with an end face of a sliding recess, a gap being present between an end face of the shutter and the cartridge body.

7. The disc cartridge according to claim 1, wherein the cartridge body has an upper half and a lower half, the cartridge body rotatably supporting the disc-shaped recording medium therein, a magnet clamping hub having a hat-shaped portion disposed at a central portion of the disc cartridge for receiving a spindle of a driving device therein, a top end face of the hat-shaped portion being in contact with an inner surface of the upper half when the spindle of the driving device is inserted into the hub.

8. The disc cartridge according to claim 7, wherein a disc receiving rib protrudes from the inner surface of the upper half, the top end face of the hat-shaped portion being in contact with the inner surface of the upper half, without the disc-shaped recording medium being in contact with the disc receiving rib, when the spindle of the driving device is inserted into the hub.

9. A disc cartridge containing a disc-shaped recording medium, said disc cartridge comprising:
   a cartridge body having an opening portion for exposing a portion of a surface of the disc-shaped recording medium contained therein;
   a shutter for covering and uncovering the opening portion;
   a slider for supporting the shutter, disposed on the cartridge body for sliding thereon;
   a spring for resiliently restoring the slider and the shutter to the shutter covering position;
   the slider being a rod member having an engagement part having a pair of protrusions extending from opposite sides thereof, each protrusion having a wedge-shaped inclined surface, the cartridge body having a pair of corresponding grooves or protrusions for engaging the engagement part, each of the wedge-shaped inclined surfaces engaged to the corresponding grooves or protrusions solely by a line contact therebetween.

10. The disc cartridge of claim 9, wherein the engagement part of the slider is divided by a slit which extends along a sliding direction of the slider.

11. The disc cartridge of claim 9, wherein each of the wedge-shaped inclined surfaces is inclined in a direction tapering towards the inside of the cartridge body.

12. The disc cartridge according to claim 9, wherein the cartridge body has an upper half and a lower half, and rotatably supports the disc-shaped recording medium therein, a magnet clamping hub having a hat-shaped portion disposed at a central portion of the disc cartridge for receiving a spindle of a driving device therein, a plurality of annular-shaped disc receiving ribs disposed on disc containing wall surfaces of the upper half and the lower half, positioned adjacent to a non-recording area at an inner circumferential portion of the disc-shaped recording medium, at least one of the surfaces of the ribs and a corresponding adjacent surface of the inner circumferential portion being roughened.

13. The disc cartridge according to claim 9, wherein the slider is slidably disposed on one side edge of the disc cartridge, the shutter being secured to the slider, the slider having a shutter opening slot having a lower surface for receiving a shutter opening slot pin, the lower surface positioned flush with or below an upper end surface of a guide sliding portion of a half of the cartridge body, the slot pin rotated on the upper end surface of the guide sliding portion.

14. The disc cartridge according to claim 9, wherein when the shutter covers the disc-shaped recording medium, an end face of the slider is in contact with an end face of a sliding recess, a gap being present between an end face of the shutter and the cartridge body.

15. The disc cartridge according to claim 9, wherein the cartridge body has an upper half and a lower half, the cartridge body rotatably supporting the disc-shaped recording medium therein, a magnet clamping hub having a hat-shaped portion disposed at a central portion of the disc cartridge for receiving a spindle of a driving device therein, a top end face of the hat-shaped portion being in contact with an inner surface of the upper half when the spindle of the driving device is inserted into the hub.

16. The disc cartridge according to claim 15, wherein a disc receiving rib protrudes from the inner surface of the upper half, the top end face of the hat-shaped portion being in contact with the inner surface of the upper half, without the disc-shaped recording medium being in contact with the disc receiving rib, when the spindle of the driving device is inserted into the hub.

17. The disc cartridge containing a disc-shaped recording medium, said disc cartridge comprising:
   a cartridge body having an opening portion for exposing a portion of a surface of the disc-shaped recording medium contained therein;
   a shutter for covering and uncovering the opening portion;
   a slider for supporting the shutter, disposed on the cartridge body for sliding thereon;
   a spring for resiliently restoring the slider and the shutter to the shutter covering position;
   the slider being a rod member having an engagement part having a pair of protrusions extending from opposite sides thereof, each protrusion having a wedge-shaped inclined surface, the cartridge body having a pair of corresponding grooves or protrusions for engaging the engagement part, each of the wedge-shaped inclined surfaces engaged to the corresponding grooves or protrusions solely by a line contact therebetween; and
   the engagement part of the slider being divided by a slit extending along a sliding direction of the slider.

18. The disc cartridge of claim 17, wherein each of the wedge-shaped inclined surfaces is inclined in a direction tapering towards the inside of the cartridge body.

19. The disc cartridge according to claim 17, wherein the cartridge body has an upper half and a lower half, and rotatably supports the disc-shaped recording medium therein, a magnet clamping hub having a hat-shaped portion disposed at a central portion of the disc cartridge for receiving a spindle of a driving device therein, a plurality of annular-shaped disc receiving ribs disposed on disc containing wall surfaces of the upper half and the lower half, positioned adjacent to a non-recording area at an inner circumferential portion of the disc-shaped recording medium, at least one of the surfaces of the ribs and a corresponding adjacent surface of the inner circumferential portion being roughened.

20. The disc cartridge according to claim 17, wherein the slider is slidably disposed on one side edge of the disc cartridge, the shutter being secured to the slider, the slider having a shutter opening slot having a lower surface for receiving a shutter opening slot pin, the lower surface positioned flush with or below an upper end surface of a guide sliding portion of a half of the cartridge body, the slot pin rotated on the upper end surface of the guide sliding portion.

21. The disc cartridge according to claim 17, wherein when the shutter covers the disc-shaped recording medium, an end face of the slider is in contact with an end face of a sliding recess, a gap being present between an end face of the shutter and the cartridge body.

22. The disc cartridge according to claim 17, wherein the cartridge body has an upper half and a lower half, the cartridge body rotatably supporting the disc-shaped recording medium therein, a magnet clamping hub having a hat-shaped portion disposed at a central portion of the disc cartridge for receiving a spindle of a driving device therein, a top end face of the hat-shaped portion being in contact with an inner surface of the upper half when the spindle of the driving device is inserted into the hub.

23. The disc cartridge according to claim 22, wherein a disc receiving rib protrudes from the inner surface of the upper half, the top end face of the hat-shaped portion being in contact with the inner surface of the upper half, without the disc-shaped recording medium being in contact with the disc receiving rib, when the spindle of the driving device is inserted into the hub.

24. A disc cartridge containing a disc-shaped recording medium, said disc cartridge comprising:

a synthetic resin cartridge body having an opening portion for exposing a portion of a signal recording surface of the disc-shaped recording medium rotatably supported therein;

a metal shutter for covering and uncovering the opening portion;

a slider for supporting the shutter, disposed in a sliding recess on the cartridge body for sliding therein;

a spring for resiliently restoring the slider and the shutter to the covering position;

the slider having an engagement part facing an inside of the cartridge body, the engagement part formed as a wedge-shaped inclined surface, the cartridge body having a corresponding groove or protrusion formed along a side thereof for engaging the engagement part, the engagement part of the slider being engaged to the groove or protrusion solely by a line contact therebetween, such that when the shutter is in the covering position, an end face of the slider is in contact with an end face of the sliding recess and a gap is present between an end face of the shutter and the cartridge body.

25. A disc cartridge containing a disc-shaped recording medium, said disc cartridge comprising:

a cartridge body having an opening portion for exposing a portion of a surface of the disc-shaped recording medium contained therein, the cartridge body having an upper half and a lower half;

a shutter for covering and uncovering the opening portion;

a slider for supporting the shutter, disposed in a sliding recess on the cartridge body for sliding therein;

a spring for resiliently restoring the slider and the shutter to the covering position;

the slider having an engagement part facing an inside of the cartridge body, the engagement part formed as a wedge-shaped inclined surface, the cartridge body having a corresponding groove or protrusion formed along a side thereof for engaging the engagement part, the engagement part of the slider being engaged to the groove or protrusion solely by a line contact therebetween;

a magnet clamping hub having a hat-shaped portion disposed at a central portion of the disc cartridge for receiving a spindle of a driving device therein, a top end face of the hat-shaped portion being in contact with an inner surface of the upper half when the spindle of the driving device is inserted into the hub;

annular shaped disc receiving ribs on disc-containing wall surfaces of the upper half and the lower half, positioned adjacent to a non-recording area at an inner circumferential portion of the disc-shaped recording medium;

at least one of the surfaces of the ribs and a corresponding adjacent surface of the inner circumferential portion of the disc-shaped recording medium being roughened;

the slider having a shutter opening slot having a lower surface for receiving a shutter opening slot pin, the lower surface being flush with or below an upper end surface of a guide sliding portion of a half of the upper and lower halves of the cartridge body, the slot pin rotated on the upper end surface of the guide sliding portion; and such that when the shutter is in the covering position, an end face of the slider is in contact with an end face of the sliding recess and a gap is present between an end face of the shutter and the cartridge body.

* * * * *